US012714250B2

(12) United States Patent
Threlfall

(10) Patent No.: US 12,714,250 B2
(45) Date of Patent: Aug. 25, 2026

(54) ARTICLE SUPPORT SYSTEM

(71) Applicant: John Threlfall, Volcano, HI (US)

(72) Inventor: John Threlfall, Volcano, HI (US)

( * ) Notice: Subject to any disclaimer, the term of this patent is extended or adjusted under 35 U.S.C. 154(b) by 0 days.

(21) Appl. No.: 18/974,288

(22) Filed: Dec. 9, 2024

(65) Prior Publication Data

US 2025/0098886 A1 Mar. 27, 2025

Related U.S. Application Data

(63) Continuation-in-part of application No. 18/197,089, filed on May 14, 2023, now Pat. No. 12,196,363.

(60) Provisional application No. 63/342,091, filed on May 14, 2022.

(51) Int. Cl.
*A47G 29/08* (2006.01)
*F16B 45/00* (2006.01)

(52) U.S. Cl.
CPC .............. *A47G 29/08* (2013.01); *F16B 45/00* (2013.01)

(58) Field of Classification Search
CPC ...... A47G 29/08; F16B 45/00; F16M 13/022; A47F 5/0838; A47F 5/0807; A47F 5/0853
See application file for complete search history.

(56) References Cited

U.S. PATENT DOCUMENTS 2,754,974 A * 7/1956 Larson .................. A47L 13/512 248/222.12
4,140,224 A * 2/1979 Celeste ................. A47F 5/0025 40/661.03
4,629,076 A * 12/1986 Amstutz ............... A47F 5/0846 156/64
5,687,856 A * 11/1997 Kendrena ............. A47L 13/512 211/94.01
5,887,731 A * 3/1999 Thalenfeld .............. A47F 5/083 248/222.51
5,944,294 A * 8/1999 Baer ...................... A47F 5/0846 248/220.43
7,861,871 B2 * 1/2011 Kao ...................... A47F 7/0028 206/349
7,954,651 B2 * 6/2011 Kao ......................... B25H 3/04 248/303
9,144,306 B2 * 9/2015 Kao ....................... A47B 81/00
9,925,657 B1 * 3/2018 Kao .......................... B25H 3/04
2017/0311720 A1 * 11/2017 Centrella ............. A47B 96/067

* cited by examiner

*Primary Examiner* — Ko H Chan
(74) *Attorney, Agent, or Firm* — Roger A. Jackson

(57) ABSTRACT

Article support system that is adapted to support an article relative to a surface, the system includes a rigid rail and a flexible support arm extension having proximal and distal end portions, the distal end portion is adapted to removably engage the article, the proximal end portion is formed as a box channel having an upper leg, a lower leg, and a web disposed therebetween, each of the upper and lower legs terminating in an upper and lower return respectively such that the upper return, upper leg, web, lower leg, and lower return form a “C” shape cross section. Operationally, to removably engage the support arm extension to the rail, the upper leg, and the upper return are manually placed about a rail primary margin portion and the lower leg and the lower return are manually pushed over a rail secondary margin portion through flexure of the web.

9 Claims, 12 Drawing Sheets

50
105
85
110
60
60
70
80
95, 140
61
65
90, 140
150
150
100
150
125
85
55
56
55
56
55
56
55
56
55
56
115
155
175
75
60
85
61
65

ARTICLE SUPPORT SYSTEM

CROSS-REFERENCE TO RELATED APPLICATIONS

This is a continuation in part (CIP) patent application of U.S. patent application Ser. No. 18/197,089 filed on May 14, 2023 by John Threlfall of Volcano, Hawaii, US., that claims the benefit of U.S. provisional patent application Ser. No. 63/342,091 filed on May 14, 2022 by John Threlfall of Volcano, Hawaii, U.S.

BACKGROUND OF INVENTION

The present invention relates to an article support system and a method associated with the system. More particularly, the system includes a substantially rigid element being the rail, in conjunction with a variety of flexible support arm extensions which will all have one common feature, permitting the rapid attachment or detachment of the flexible support arm extensions from the rail, when employing the associated method.

The present invention allows the rapid customization of a hanging, storage, or other system of organization or construction. This can be a built-in feature, or an add-on in any room, closet, cabinet, furniture, vehicle, etc. The preferred one-piece design of the flexible support arm extensions allows for the manufacture of a wide variety of low-cost durable choices at an attractive price point for the consumer. The core components of the invention are: 1) the "rail", which may be of any length, substantially rigid, and of uniform cross-section and 2) the flexible support arm extensions, that will have an opening corresponding to the cross-sectional profile of the rail, and sufficient flexibility to allow it to be snapped onto the rail when using the associated method. The rail will have a cross-section similar to a pill shape, with semi-circular ends and elongated parallel sides. The flexible support arm extensions will have an opening that is the same shape and size as the afore-mentioned cross-section, although with one side mostly missing, thus approximating a "C" shape with a straight vertical and an upper and lower "claw". Although not essential, to employ the preferred method of attaching and detaching, at least one part of the associated flexible support arm extensions will have a graspable component coming from the lower backside of the "C" shape.

With respect to the method of the present invention, the user, holding the graspable component of the support arm extensions, hooks the upper "claw" of the "C" onto the upper curve of the rail and rotates the support arm extensions such that the lower "claw" of the "C" bumps against the lower curve of the rail. At this point, sufficient pressure is applied to bend the flexible back section of the "C" and allow the lower claw to go over the bottom curve of the rail and then snap down again, resulting in a snug fit of the flexible support arm extensions onto the rail. To remove the support arm extensions, the graspable component is pulled outward and upward, thus bending the flexible back of the "C", while dragging the lower claw across the bottom curve of the rack, leading to a sudden release of the flexible support arm extensions from the rail. In normal use, the weight of the flexible support arm extensions, along with any associated load form an article, will pull downward and inward, thus helping to tighten the grip of the support arm extensions onto the rail. Ultimately, at the conclusion of these steps, one or more flexible support arm extensions have been placed where desired on the rail, without the use of any additional tools or hardware, yet maintaining a firm grip on the rail, and now ready for use.

The convex feature of the rail, and the concave feature of the flexible support arm extensions may be combined into one unit of any shape desired, with any number of each feature present, to create a system of rapid construction of a general sort, or as a kit for the rapid assembly of a particular item, such as a chair, table, shelter, etc. The invention may be used in any situation where a simple, rapid method of assembly, and/or disassembly is desired for a plurality of flexible support arm extensions. For example, a handle on the flexible support arm extensions that can be snapped on when desired, and then removed when no longer needed. Likewise, a removable armrest for a chair, or a removable seat-like extension for situations such as parks, sporting arenas and vehicles. The cross-sectional profile of the rail and of the corresponding flexible support arm extensions may be altered, so as to optimize performance characteristics in different circumstances, for example, the profiles can be modified to make it relatively easy to snap on, but harder to snap off.

The preferred embodiment consists of a rail, of a material of sufficient strength and rigidity, such as aluminum, with an oblong cross-section resembling a rectangle with a semi-circle at each end. In conjunction with the rail, are any number and variety of flexible support arm extensions, of any material, such as plastic, that has a degree of elasticity. While the shape and function of each flexible support arm extensions can vary greatly, each one will have a concave opening whose cross-section matches that of the rail, with an opening on one side, which roughly corresponds to one of the sides of the rectangle. The contour of the opening will thus resemble a C-shape, or two semi-circles connected by a straight segment. This C-shaped part of each flexible support arm extensions will have sufficient elasticity to allow it to be forced over and snapped onto the rail, when using the associated method.

The variety of flexible support arm extensions may include, but not be limited to: hooks, hangers, light fixtures, shelves, bottle holders, vases, mirrors, and so on. Part of each flexible support arm extensions will extend from the lower portion of the C-shaped part, in a manner that will allow it to be grasped by the user. This will facilitate the preferred method of coupling and uncoupling the flexible support arm extensions from the rail, to couple the support arm extensions to the rail, the user grasps the lower extending feature and hooks the lower part of the concave opening onto the matching lower curve of the rail.

Currently there are a number of solutions for the need to create a rapid, expandable, customizable and economical, hanging, storage, or organizational apparatus/system. Some of these solutions attempt to solve the problem by means of rails, or tracks, where multiple hangers may be clipped onto the track, or placed on the track by means of sliding onto it from one end.

These solutions fail to meet the needs of the industry because they are bulky, time consuming to re-arrange, loose or wobbly, or costly to manufacture. Other solutions attempt to achieve ease of assembly and rearrangement, as well as a secure grip on the rail, but these solutions are similarly unable to meet the needs of the industry, because they require mechanisms with multiple parts and therefore are bulky, vulnerable to mechanical malfunction, and expensive to manufacture.

The present invention is unique in that it is structurally different from other known devices or solutions. More specifically the presentation invention is unique in that it utilizes the principle of elasticity, in combination with an advantageous matching cross-sectional profile in both the rail and flexible support arm extensions, to achieve in a one piece design, a structural malleability that allows the support arm extensions to be attached or detached easily and swiftly from the rail, while also maintaining a tight grip on the rail when in use.

In looking at the prior art in this area, in U.S. Pat. No. 3,593,468 to Bustin, discloses an interlocking channel section for walls, ceilings, and floors, utilizing an interlocking snap channel with "U" shaped termination of the sidewall end pieces. Note that in Bustin these are permanent assemblies as opposed to the present invention being removably engageable assemblies.

Next, in the prior art in U.S. Pat. No. 4,995,323 to Kellems, discloses a modular shelving and hanger bar system that has a "C" shaped shelf with planks that are flexible having an inwardly directed lip to elastically engage the recessed channel of the raised boss.

Further, in the prior art in U.S. Pat. No. 6,733,595 to Grillo, discloses a snap collar wall hanger that has a "C" receptacle for removably holding a broom handle type of element on a foot brush assembly, however, having the tip extensions of the "C" flex outwards and the web of the "C" section being relatively stiffer which is opposite of the present invention, further, Grillo has no clamp tightening with added load as the present invention does.

Continuing, in the prior art in U.S. Pat. No. 11,460,173 to Brooks, discloses a snap rail arrangement for PC circuit boards, that has a "C" shaped channel that is flexible, see in particular FIGS. 14 and 15, that shows the snap-fit manner of the rail for the PC boards that are mounted in a row adjacent to one another.

In addition, in the prior art in United States Patent Application Publication Number US 2003/0089823 to Korczak, discloses a channel snap that uses an anchor rail shaped like a "U" shaped channel with a snap-in adaptor having flanges that engage a rail lip, wherein the adaptor is of a flexible construction that supports an article to be suspended from.

Next, in the prior art in United States Patent Application Publication Number US2018/0316300 (matured into U.S. Pat. No. 10,177,704) to Kapla, discloses a snap rail for solar panel mounting frames that has a flat spring loaded removably engageable retainer, see FIG. 6A, for making the solar panels serviceable.

What is needed is a rail with flexible support arm extensions and that it would be desirable to have a hook and rail system that is simple and customizable, allowing the rapid placement or removal of compatible support arm extensions to or from the rail. Furthermore, it would be desirable to have support arm extensions and rail system with a variety of different attachable support arm extensions s, that are of simple design and cheap to manufacture, yet strong and capable of sustaining a heavy load.

Still further, it would be desirable to have a customizable support arm extensions and rail system, where the attachments can be swiftly arranged and rearranged without needing to move the other support arm extensions first (such as by sliding everything off a rail). Further, still, it would be desirable for each support arm extensions, once placed, to hold firmly, without wobbling or sliding in relation to the rail. Therefore, there currently exists a need in the industry, for a support arm extensions and rail system that is cheap, quickly customizable, and offering a wide variety of one-piece support arm extensions which snap on and off easily, grip firmly when attached, and are robust enough to support significant weight from the rail.

The present invention is unique when compared with other known devices and solutions because it provides attachable support arm extensions that are of a flexible one-piece design, which are able to achieve desirable functional qualities, that would otherwise require a more complex, or cumbersome, or heavier mechanism. Among these qualities are the great ease and speed of attaching and detaching the support arm extensions from the rail, the firm grip of the support arm extensions to the rail when attached, and the tendency for the grip to strengthen as load is applied to the support arm extensions.

Similarly, the associated method is unique when compared with other known solutions, in that it provides a fast, non-stressful, intuitive and pleasing method of attaching and detaching the support arm extensions from the rail. Similarly, the method provides unique, visual, auditory, and proprioceptive feedback to the user, which is congruent and indicative of each stage of movement, engagement, and structural alteration of the support arm extensions as they are coupled or uncoupled from the rail.

SUMMARY OF THE INVENTION

Broadly, the present invention is the article support system that is adapted to support an article upon and relative to a wall surface, wherein the article is suspended above a floor surface that includes the substantially rigid rail structure that includes a rail first end portion and an opposing rail second end portion with a longitudinal axis spanning therebetween. Further the rail structure has a primary margin portion and an opposing secondary margin portion with a longwise axis spanning therebetween, wherein the primary and secondary margin portions are about the longitudinal axis, in addition the rail structure includes a first outer surface portion and an opposing second outer surface portion, with a shortwise axis spanning therebetween. Wherein the first and second outer surface portions are about the longitudinal axis, wherein the second outer surface is adapted to affix to the wall surface, wherein the primary and secondary margins are structurally formed as a convex semi-circular radius surface that has a tangent interface with each of the first and second outer surface portions, the longitudinal, longwise, and short wise axes are all perpendicular to one another.

Further the article support system includes the flexible support arm extension having a proximal end portion and an opposing distal end portion with an arm axis spanning therebetween, the distal end portion is adapted to removably engage the article, the proximal end portion is structurally substantially formed as a box channel having an upper leg, a lower leg, and a web disposed therebetween, each of the upper and lower legs terminating in an upper and lower return respectively such that the upper return, upper leg, web, lower leg, and lower return substantially form a "C" shape in cross section.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 2 shows a close-up view of a single flexible support arm extension and the rail structure of FIG. 1, wherein FIG. 2 shows the upper perspective view of the article support system that includes the rail structure, and the flexible support arm extension;

FIG. 3 shows view 3-3 from FIG. 2, wherein FIG. 3 shows the detail of the interface of the flexible support arm proximal end portion "C" shaped cross section to the rail structure in the assembled operational state;

FIG. 8 is a continuation of FIG. 7, wherein FIG. 8 shows the operation to removably engage the support arm extension to the rail structure through applying the first force, wherein the upper leg and the upper return are manually snapped over the primary margin portion via the first force and web bow to fully install the flexible support arm to the rail structure being in the assembled state;

DETAILED DESCRIPTION OF THE INVENTION

Figure 6:
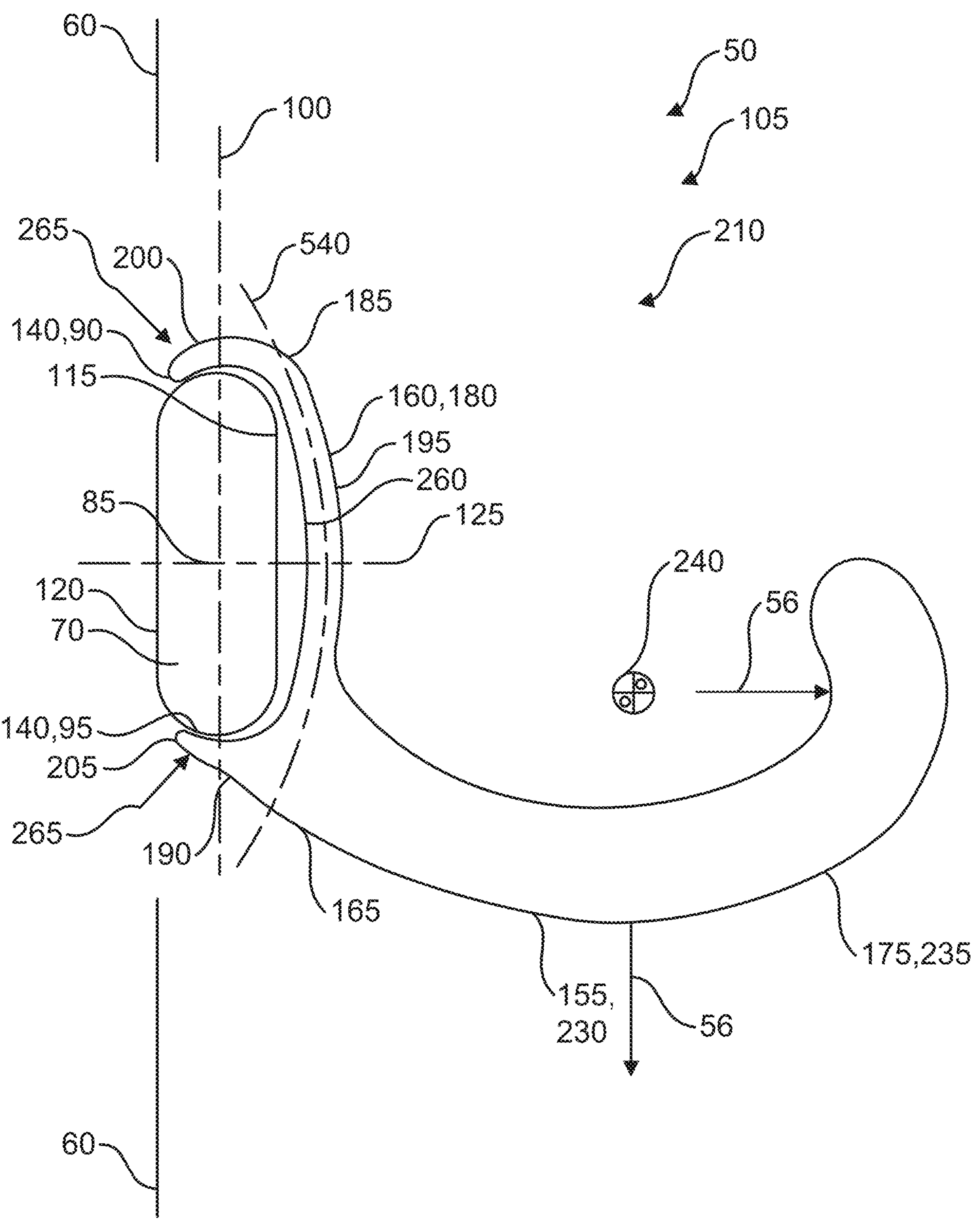
FIG. 6 also originates from FIG. 3, wherein the finger extension portion terminates in the open "J" hook that is positioned opposite of the upper and lower legs relative to the web, wherein the open "J" hook has a center of gravity from the weight of the article to bow the web into a concave arc away from the rail structure first outer surface that results in the upper and lower legs that terminate in the upper and lower returns respectively having force to be moved closer to one another, resulting in a tighter grip of the upper and lower legs and respective returns upon the rail structure primary and secondary margins.

50 Article Support System
55 Article that can be in the form of a coat, jacket, scarf, belt, shirt, tools, utensils, extension cords, and the like that can further include light fixtures, tarpaulins, and basically anything that needs to be suspended over a surface
56 Weight or force of the article 55 that can be parallel to the longwise axis 100 or parallel to the shortwise axis 125
60 Wall or other support surface or a seat surface, ceiling, or truck bed side/rail, that would facilitate article 55 weight 56 to be in two directions ninety degrees apart from one another, see FIG. 6
61 Suspended nature of the article 55 over and above the floor surface 65
65 Floor surface, truck bed rail, or truck bed
70 Substantially rigid rail structure
75 First end portion of the rail structure 70
80 Second end portion of the rail structure 70
85 Longitudinal axis of the rail structure 70
90 Primary margin portion of the rail structure 70
95 Secondary margin portion of the rail structure 70
100 Longwise axis of the rail structure 70
105 Assembled operational state of the rail structure 70 and the support arm extension 155
106 Disassembled operational state of the rail structure 70 and the support arm extension 155
110 Primary 90 and secondary 95 margin portions being about the longitudinal axis 85
115 First outer surface portion of the rail structure 70
120 Second outer surface portion of the rail structure 70
125 Shortwise axis of the rail structure 70
130 First 115 and second 120 outer surfaces being about the longitudinal axis 85
135 Second outer surface being adapted to affix to the vertical wall or other surface 60
140 Convex semi-circular radius surface of the primary 90 and secondary 95 margins
145 Tangent interface of the primary 90 and secondary 95 margins to the first 115 and second 120 outer surface portions

150 Perpendicular position of the longitudinal 85, longwise 100, and shortwise 125 axes to one another
155 Flexible support arm extension
160 Proximal end portion of the support arm extension 155, the channel support arm extension 156, and the channel support arm extension 156
165 Distal end portion of the support arm extension 155, the channel support arm extension 156
175 Distal end portion 165 being adapted to removably engage the article 55
180 Box channel of the proximal end portion 160
185 Upper leg of the box channel 180
190 Lower leg of the box channel 180
195 Web of the box channel 180
200 Upper return of the box channel 180
205 Lower return of the box channel 180
210 Substantially "C" shape cross section formed from the upper return 200, 201, upper leg 185, 186, web 195, 196, lower leg 190, 191, and lower return 205, 206
215 Manually spreading apart the lower 190 leg
220 Positioning the "C" shape 210 about the rail structure 70 primary 90 margin portion and the first outer surface 115
221 Moving the flexible support arm extension 155 toward the rail structure 70
225 Manually relaxing the upper 185 and lower 190 legs to allow the upper return 200, the upper leg 185, the web 195, the lower leg 190, and the lower return 205 to adjacently grip the rail structure 70 primary 90 and secondary 95 margin portions and the first outer surface 115 to secure the support arm extension 155 to the rail structure 70 thus locking the support arm extension 155 from movement in the longitudinal 85, longwise 100, shortwise 125, arm 170 axes
230 Finger extension portion
235 Open "J" hook
240 Center of gravity of the open "J" hook
260 Bow of the web 195 into a concave arc away from the rail structure 70 first outer surface 115
265 Force from the article weight 56 to move the upper 200 and lower 205 returns toward one another to have a tighter grip of the upper 185 and lower 190 legs and upper 200 and lower 205 returns upon the rail structure 70 primary 90 and secondary 95 margins to better resist the heavy 56 article 55 dislodging the support arm structure 155 from the rail structure 70
285 Manual grasping of the open "J" hook 235
300 Bow of the web 195 into a convex arc away from the rail structure 70 first outer surface 115
305 Movement of the lower leg 190 and lower 205 return from the secondary margin portion 95 resulting in a looser grip creating a gap 310 to manually dislodge the support arm extension 155 from the rail structure 70
310 Gap as between the lower leg 190 and the lower return 205 relative to the rail structure 70 secondary margin portion 95
500 Beam
505 Beam length axis
510 Juxtapose manner position between the beam length axis 505 and the longitudinal axis 85
515 Short distance of the beam 500
520 Space distance that is between the primary 90 and secondary 95 margin portions
525 Thickness distance of the beam 500
530 Thickness distance of the rail 70 that is between the first 115 and second 120 outer surface portions
535 Pair of longwise space gaps that are defined by the surface 60, the short distance 515 of the beam 500, and the second outer surface portion 120 to the tangent interfaces 145 of the primary 90 and secondary 95 margins
540 Web axis that is disposed between the upper 185 and lower 190 legs
545 Finger extension axis on the finger extension portion 230 that is disposed between the arm proximal end portion 570 and the arm distal end portion 575
550 Substantially outward perpendicular projection of the finger extension portion 230 from the web 195
555 Opposingly more adjacent position of the finger extension portion 230 relative to the lower leg 190 than to the upper leg 185
560 Substantially perpendicular position of the finger extension axis 545 to the web axis 540
565 Arm portion
570 Proximal end portion of the arm portion 565
575 Distal end portion of the arm portion 565
576 Termination of the distal end portion 575 of the arm portion 565
580 Length of the arm portion 565 between the arm proximal end portion 570 and the arm distal end portion 575
585 Arm portion length 580 being greater than the web distance 590
590 Web distance that is disposed between the upper 185 and lower 190 legs
595 Affixed structure of the arm portion 565 proximal end portion 570 to the web 195
600 First means for removably engaging the article 55 that is disposed upon the arm portion 565 distal end portion 575
605 Cross sectional area of the arm portion 565
610 Cross sectional area of the web 195
615 Higher bending stiffness along the finger extension axis 545 of the arm portion 565
620 Lower bending stiffness along the web axis 540 of the web 195
625 Manual grasping of the first means 600
630 First force parallel to the web axis 540
635 Bending of the web 195 along the web axis 540
640 Separating of the upper 185 and lower 190 legs apart from one another removably engaging the primary 90 and secondary 95 margin portions to facilitate the assembled state 105 and the disassembled state 106
645 Fully extended upper 200 and lower 205 returns beyond the tangent interfaces 145 toward one another
650 First element that is relatively more rigid to the more flexible web 195
655 Axis if the first element 650
660 Manually grasping portion of the first element 650
665 Second element that is relatively flexible compared to the first element 650
670 Axis of the second element 665
675 Arcuate continuous span forming an inverted "U" shape of the second element
680 Projecting outward of the first element 650 in a parallel manner from the web 195 being adjacent to the lower leg 190
685 Substantially co-incident position of the web axis 540 and the first element axis 655
690 Opposing projection of the second element from the first element 650
695 Second element 665 originating or having an origination at the web 195 adjacent to the lower leg 190

Figure 1:
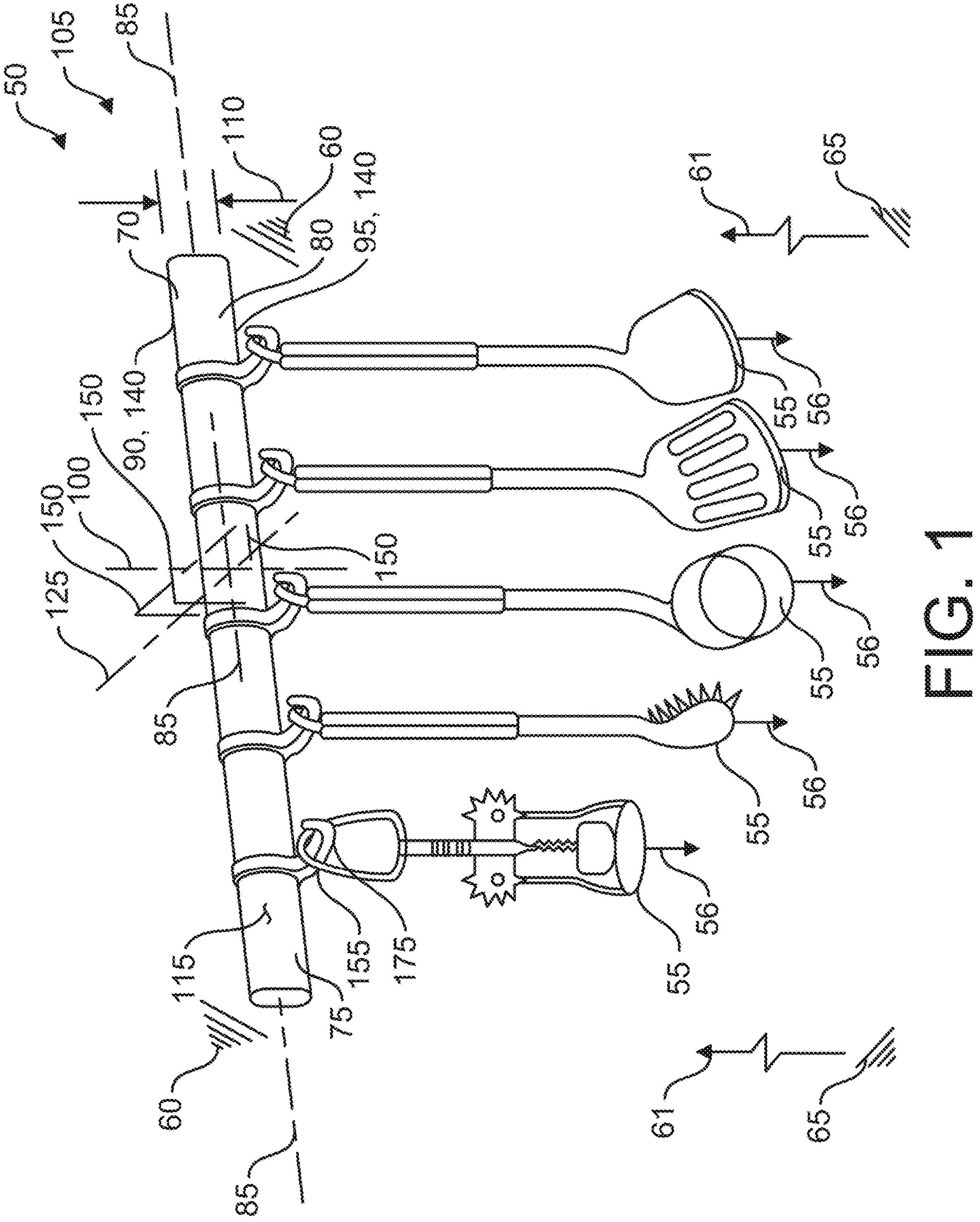
FIG. 1 shows an upper perspective view of the article support system that includes the rail structure, and the flexible support arm extension, wherein the flexible support arm extension removably engages the article to support the article, with the rail structure affixed to the wall.

700 Second element 665 termination at the opposing web 195 adjacent to the opposing lower leg 190
705 Substantially co-incident position of the first element axis 655 and the second element axis 670
710 Cross-sectional area of the first element 650
715 Bending stiffness of the first element 650
720 Manually grasping of the first element 650
725 First force that is perpendicular to the web axis 540
730 Tarp cover
735 Track bed sides
740 Angular gap between the web 195 and the origination 695 of the second element 665
745 Tarp cover weight force
750 Convex portion of the arcuate shape 675 of the second element 665
755 Tarp cover force
760 Slidable contact as between the lower leg 190 and the secondary margin portion 95
761 Slidable contact as between the upper leg 185 and the primary margin portion 90
765 Grasping manually the first means 600 to removably engage the article 55
770 Manually placing the lower leg 190 and the lower return 205 about the secondary margin portion 95
775 Pushing manually the first means 600 to removably engage the article 55 toward the primary margin portion 90 while maintaining the slidable contact 760 as between the lower leg 190 and the secondary margin portion 95
780 Making contact as between the upper return 200 and the primary margin portion 90
785 Continuing to manually push as in the step 775 the first means 600 to removably engage the article 55 toward the primary margin 90 causing the upper leg 185 and the upper return 200 to be manually pushed over the primary margin portion 90 through flexure bow 300 of the web 195 in conjunction with the upper 185 and lower 190 legs to position the substantially “C” shape 210 about the rail structure 70 primary 90 and secondary 95 margin portions and the first outer surface portion 115
790 Bringing the lower return 205 past the secondary margin portion 95 through the flexure 300 of the web 195 to facilitate the upper leg 185 to clear away from the primary margin portion 90 ultimately separating the flexible support arm extension 155 and the substantially rigid rail structure 70 from one another With initial reference to FIG. 1 shown is an upper perspective view of the article support system 50 that includes the rail structure 70, and the flexible support arm extension 155, wherein the flexible support arm extension 155 removably engages the article 55 to support 61 the article 55, with the rail structure 70 affixed 135 to the wall 60.

Figure 2:
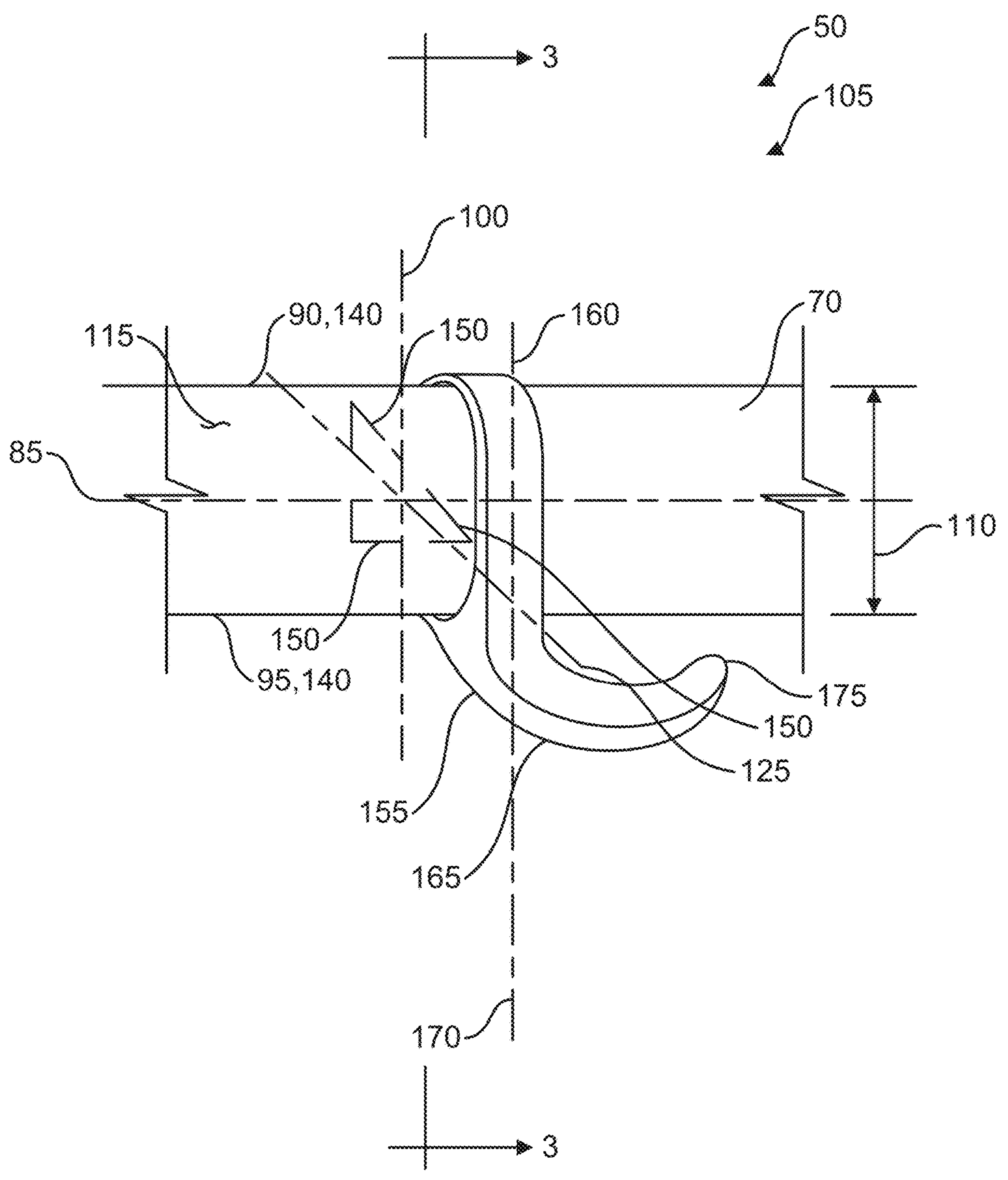

Next, FIG. 2 shows a close-up view of a single flexible support arm extension 155 and the rail structure 70 of FIG. 1, wherein FIG. 2 shows the upper perspective view of the article support system 50 that includes the rail structure 70, and the flexible support arm extension 155.

Figure 3:
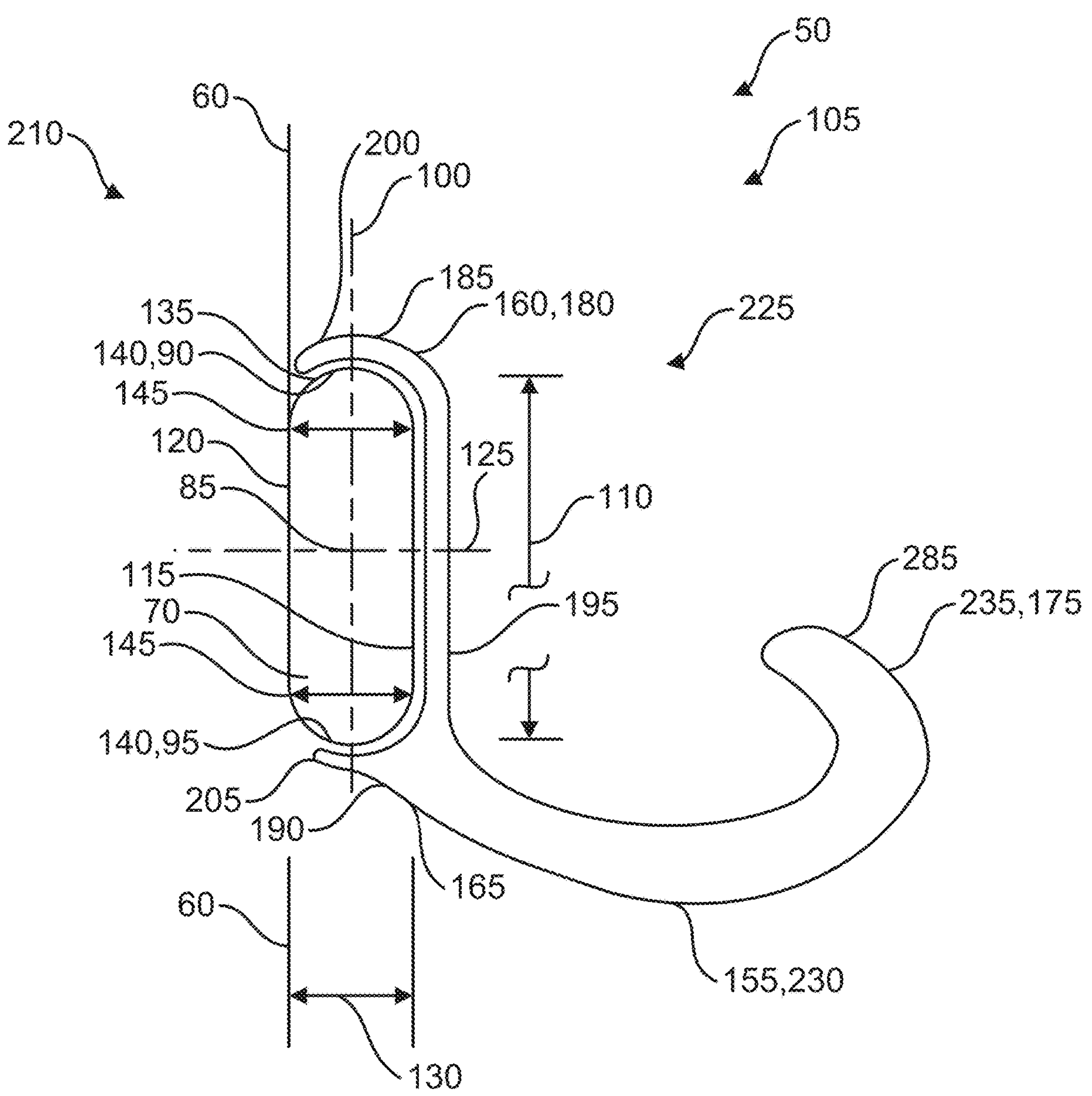

Further, FIG. 3 shows view 3-3 from FIG. 2, wherein FIG. 3 shows the detail of the interface of the flexible support arm 155 proximal end portion 160 “C” shaped cross section 210 to the rail structure 70 in the assembled operational state 105.

Figure 4:
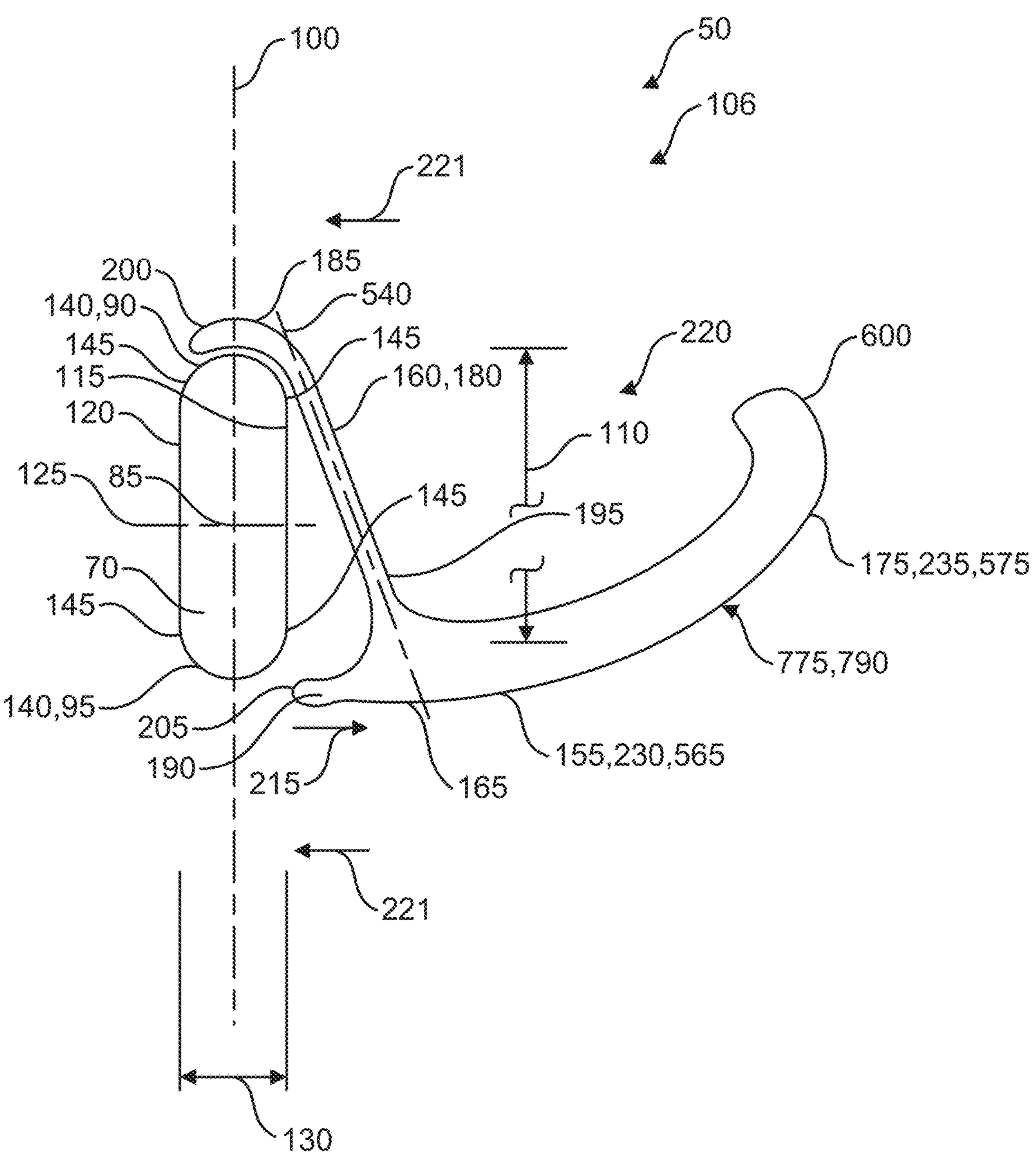
FIG. 4 originates from FIG. 3, however, showing the operation to removably engage the support arm extension to the rail structure, wherein the upper leg and said upper return are manually placed about the primary margin portion to remove the flexible support arm from the rail structure.

Continuing, FIG. 4 originates from FIG. 3, however, showing the operation to removably engage the support arm extension 155 to the rail structure 70, wherein the upper leg 185 and said upper return 200 are manually placed about the primary margin portion 90 to remove the flexible support arm 155 from the rail structure 70.

Figure 5:
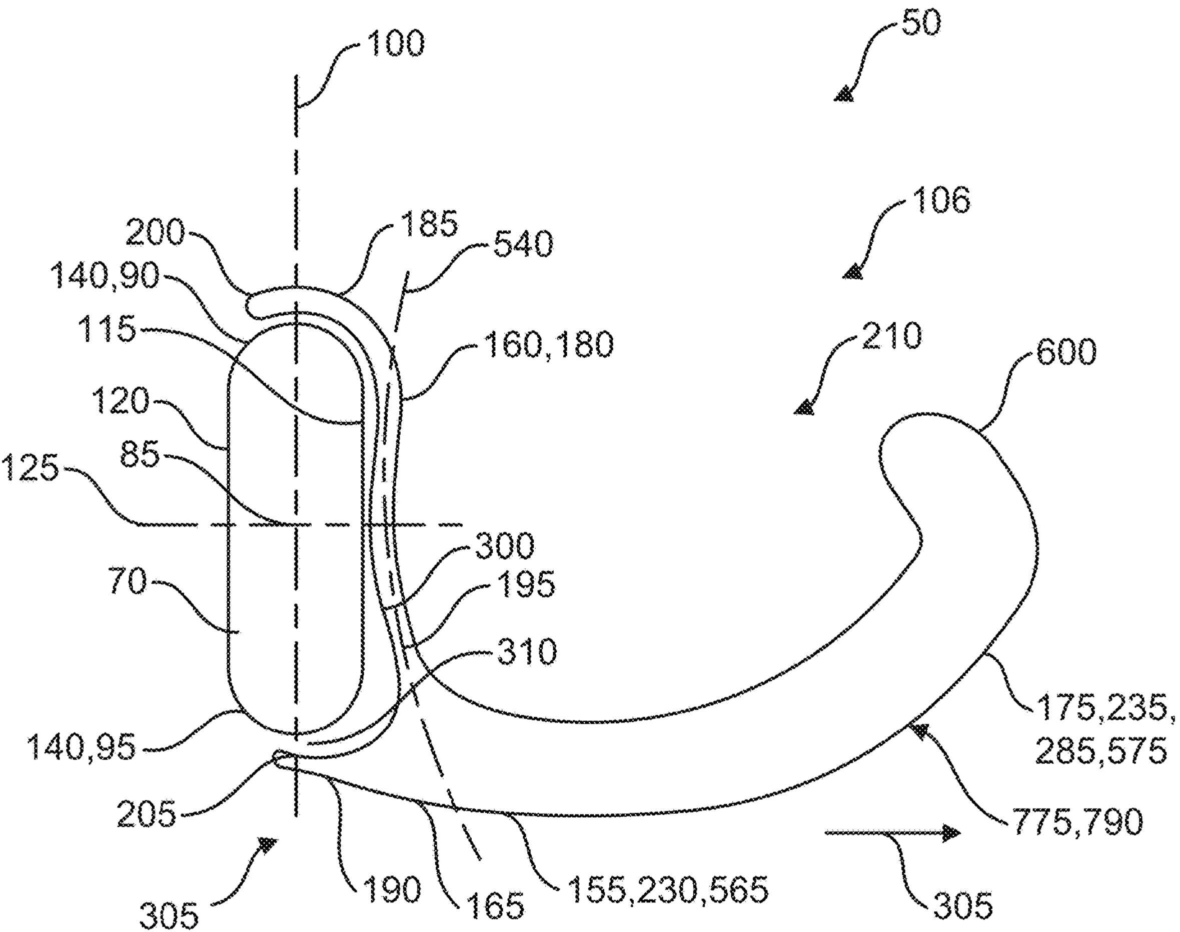
FIG. 5 also originates from FIG. 3, however, showing the operation to removably disengage the support arm extension from the rail structure, by manually pulling the distal end portion away from the web and the first outer surface in a movement parallel to the shortwise axis, to bow the web into a convex arc away from the rail structure first outer surface that results in the lower leg and lower return to be moved further from the secondary margin portion resulting in a looser grip creating a gap of the lower leg and lower return relative to the rail structure secondary margin portion to better allow dislodging of the support arm extension from said rail structure.

Moving onward, FIG. 5 also originates from FIG. 3, however, showing the operation to removably disengage the support arm extension 155 to the rail structure 70, by manually pulling 290 the distal end portion 165 away from the web 195 and the first outer surface 115 in a movement parallel 295 to the shortwise axis 125, to bow the web 195 into a convex arc 300 away from the rail structure 70 first outer surface 115 that results in the lower leg 190 and lower return 205 to be moved further from the secondary margin portion 95 resulting in a looser grip creating a gap 310 of the lower leg 190 and lower return 205 relative to the rail structure 70 secondary margin portion 95 to better allow dislodging 106 of the support arm extension 155 from the rail structure 70.

Further, FIG. 6 also originates from FIG. 3, wherein the finger extension portion 230 terminates in the open “J” hook 235 that is positioned opposite of the upper 185 and 190 lower legs relative to the web 195, wherein the open “J” hook 235 has a center of gravity 240 from the weight 56 of the article 55 to bow the web 195 into a concave arc 260 away from the rail structure 70 first outer surface 115 that results in the upper 185 and lower 190 legs that terminate in the upper 200 and lower 205 returns respectively having force 265 to be moved closer to one another, resulting in a tighter grip of the upper 185 and lower 190 legs and respective returns 200, 205 upon the rail structure 70 primary 90 and secondary 95 margins.

Figure 7:
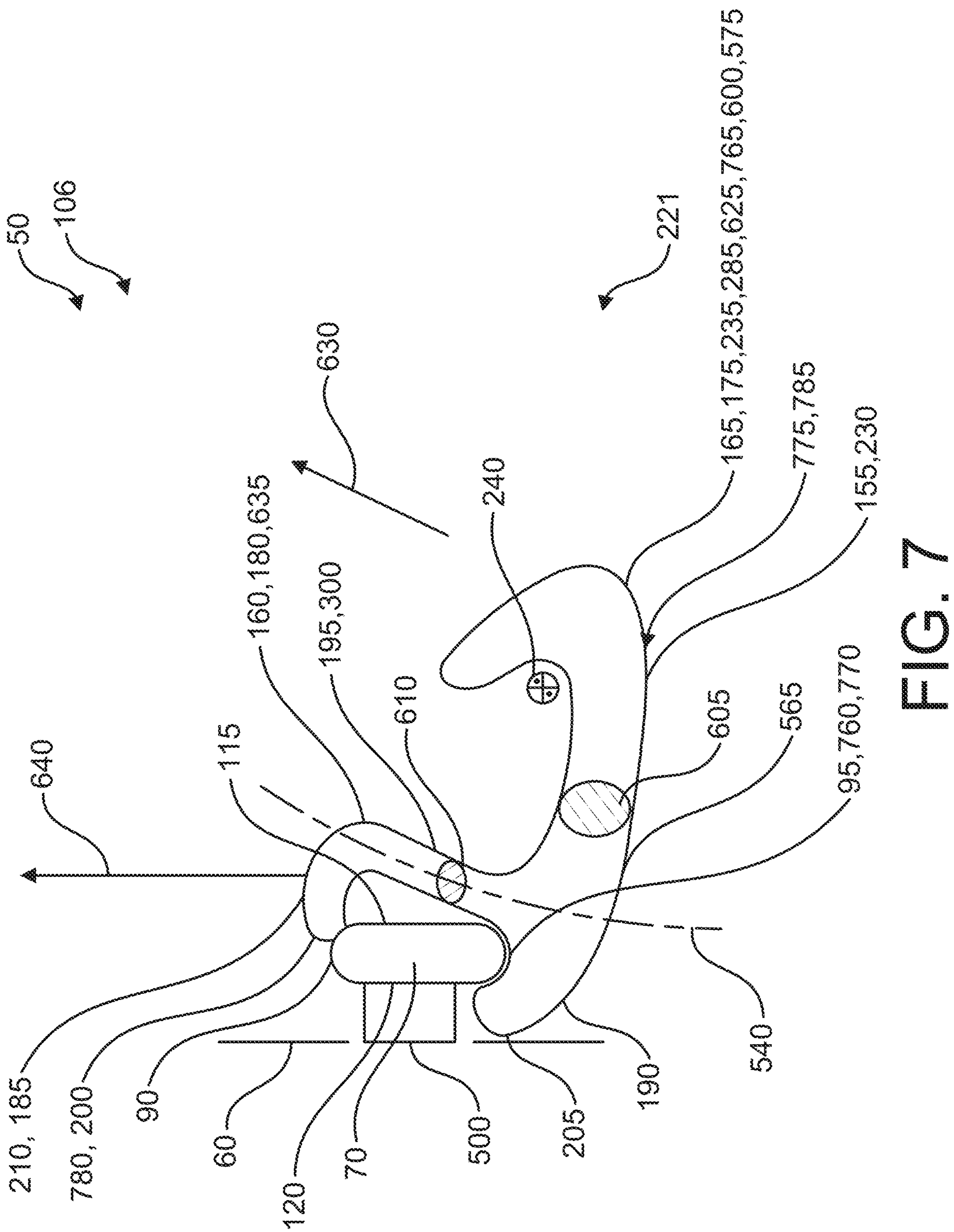
FIG. 7 shows the operation to removably engage the support arm extension to the rail structure, wherein the lower leg and the lower return are manually placed about the secondary margin portion to be in a slidable contact to install the flexible support arm to the rail structure.

FIG. 7 shows the operation to removably engage the support arm extension 155 to the rail structure 70, wherein the lower leg 190 and the lower return 205 are manually placed about the secondary margin portion 95 to be in a slidable contact 760 to install the flexible support arm extension 155 to the rail structure 70.

Figure 8:
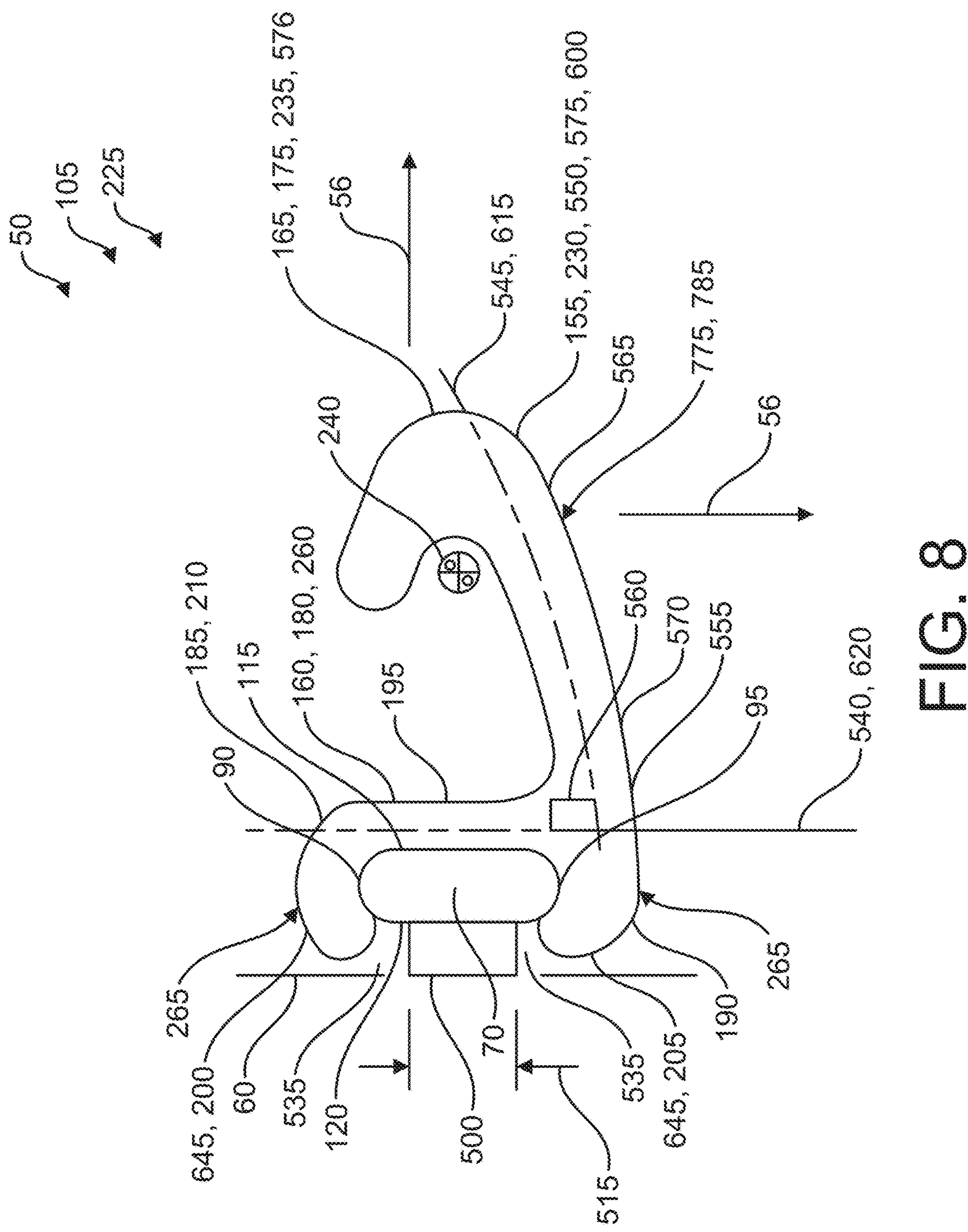

FIG. 8 is a continuation of FIG. 7, wherein FIG. 8 shows the operation to removably engage the support arm extension 155 to the rail structure 70 through applying the first force 630, wherein the upper leg 185 and the upper return 200 are manually snapped over the primary margin portion 90 via the first force 630 and web bow 300 to fully install the flexible support arm 155 to the rail structure 70 being in the assembled state 105.

Figure 9:
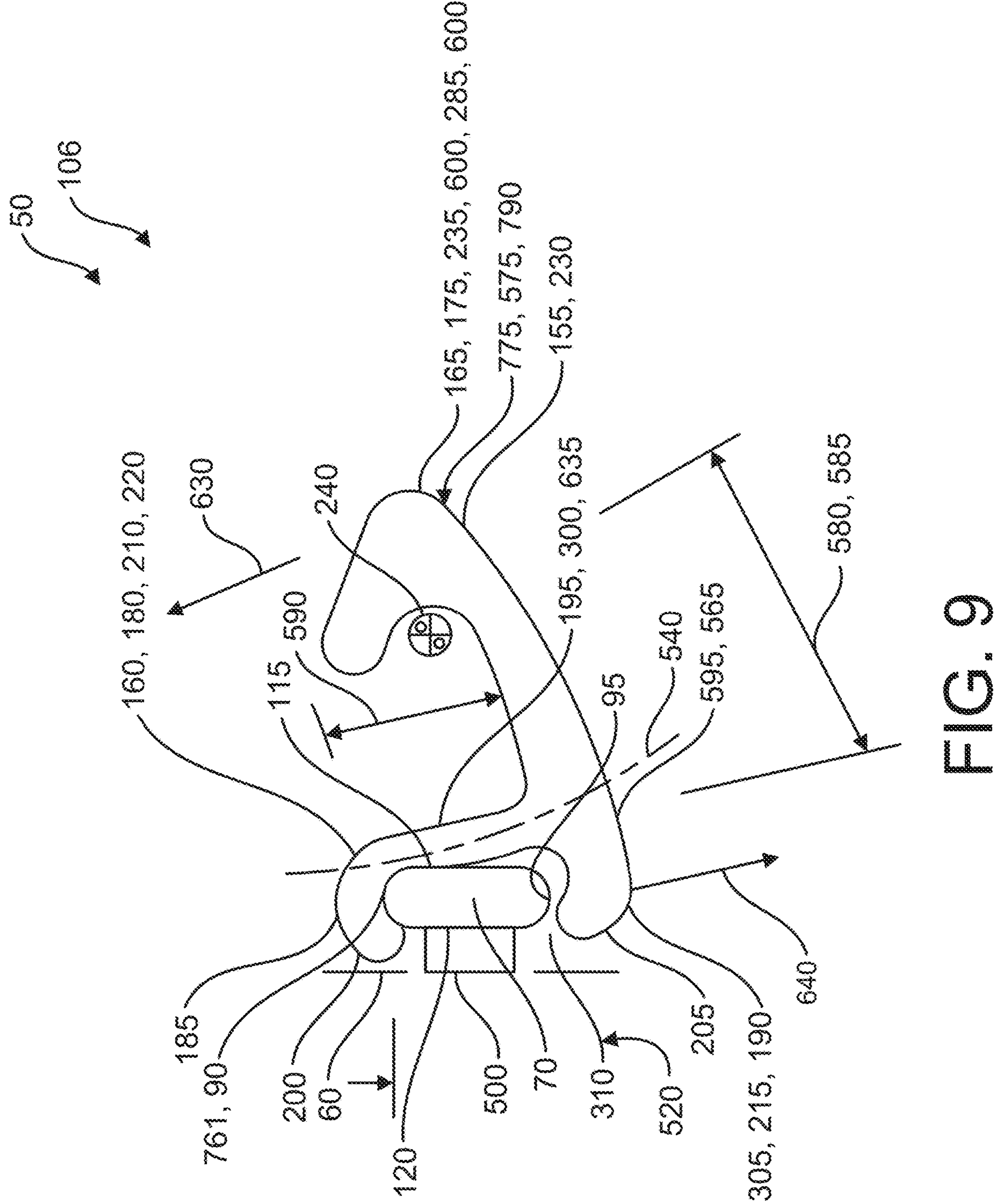
FIG. 9 shows the operation to removably engage the support arm extension from the rail structure, wherein the upper leg and the upper return are in slidable contact with the primary margin portion and through the first force, the lower leg and the lower return are manually snapped over the secondary margin portion via the first force and web bow to fully uninstall the flexible support arm from the rail structure being in the disassembled state.

FIG. 9 shows the operation to removably engage the support arm extension 155 from the rail structure 70, wherein the upper leg 185 and the upper return 200 are in slidable contact 761 with the primary margin portion 90 and through the first force 630, the lower leg 190 and the lower return 205 are manually snapped over the secondary margin portion 95 via the first force 630 and web bow 300 to fully uninstall the flexible support arm 155 from the rail structure 70 being in the disassembled state 106.

Figure 10:
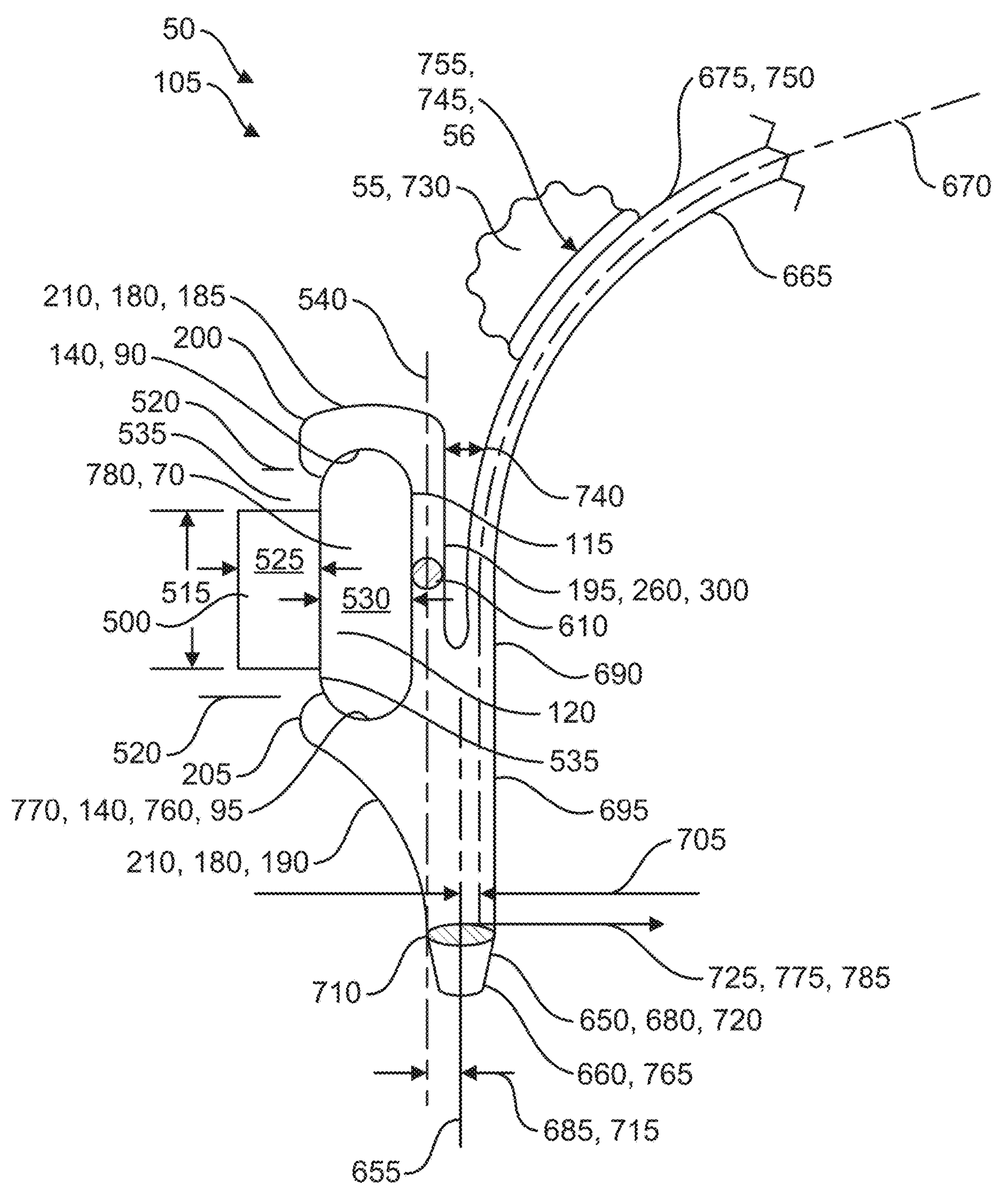
FIG. 10 shows the detail of the interface of the flexible support arm proximal end portion "C" shaped cross section to the rail structure in the assembled operational state for the article support system version that attaches to a truck bed that includes a first element for a grasping handhold and a second element that forms an arcuate section that terminates in another support arm extension that is oppositely positioned on the truck bed.

FIG. 10 shows the detail of the interface of the flexible support arm extension 155 proximal end portion 160 “C” shaped cross section 210 to the rail structure 70 in the assembled operational state 105 for the article support system 50 version that attaches to a truck bed 735 that includes a first element 650 for a grasping handhold 720 and a second element 665 that forms an arcuate section 675 that terminates 700 in another support arm extension 155 that is oppositely positioned on the truck bed 735.

Figure 11:
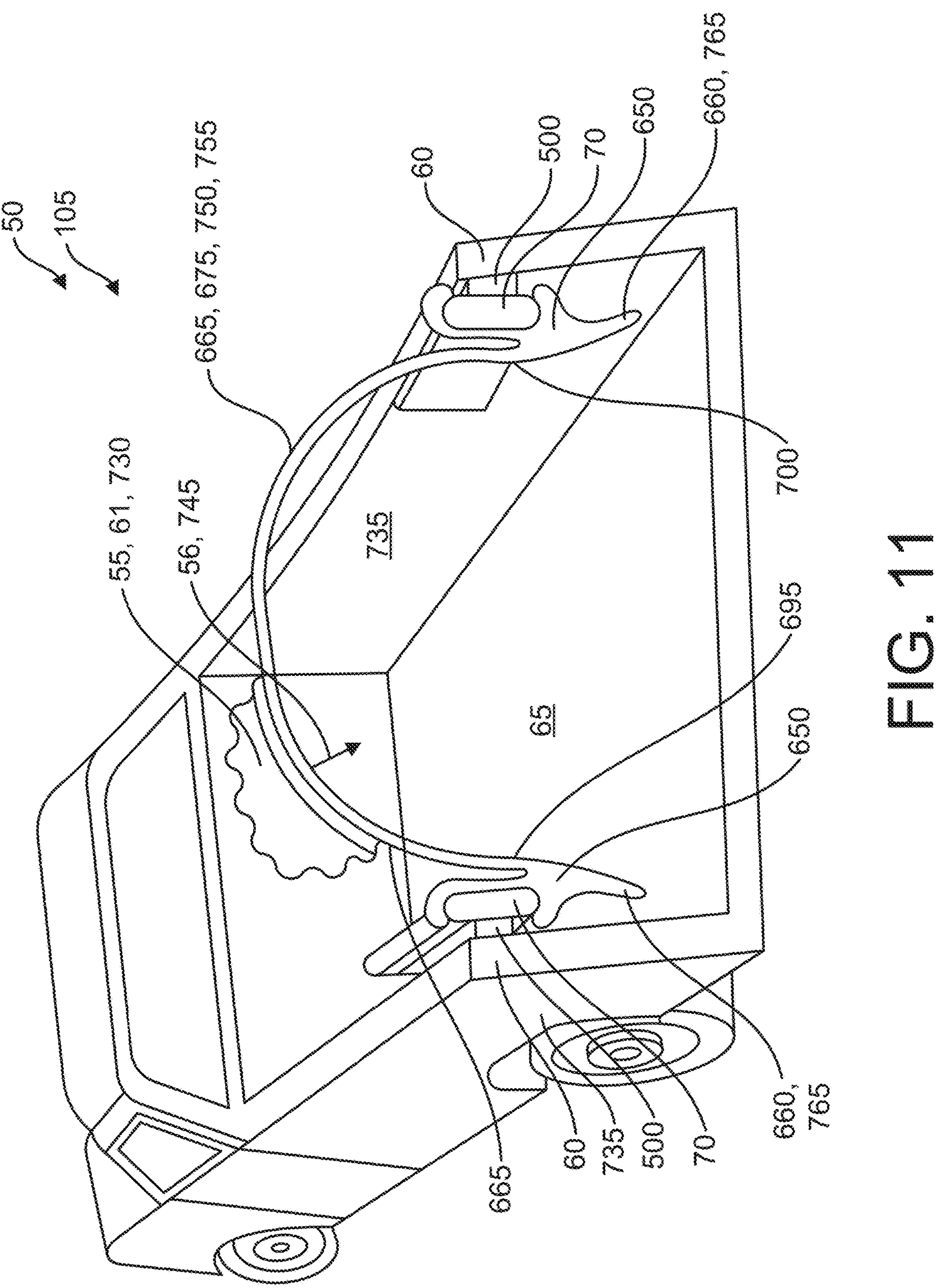
FIG. 11 shows the installed use detail of the article support system with the rail structure affixed to the insides of the truck bed sides, with the interface of the flexible support arm proximal end portion "C" shaped cross section to the rail structure in the assembled operational state for the article support system version that attaches to the truck bed that includes the first element for a grasping handhold and a second element that forms an arcuate section that can support an article in the form of a tarp cover, wherein the arcuate section terminates in another support arm extension that is oppositely positioned on the truck bed.

FIG. 11 shows the installed use detail of the article support system 50 with the rail structure 70 affixed to the insides of the truck bed sides 735, with the interface of the flexible support arm 155 proximal end portion 160 “C” shaped cross section 210 to the rail structure 70 in the assembled operational state 105 for the article support system 50 version that attaches to the truck bed 735 that includes the first element 650 for the grasping handhold 720 and the second element 665 that forms the arcuate section 675 that can support an article 55 in the form of a tarp cover, wherein the arcuate section 675 terminates 700 in another support arm extension 155 that is oppositely positioned on the truck bed 735.

Figure 12:
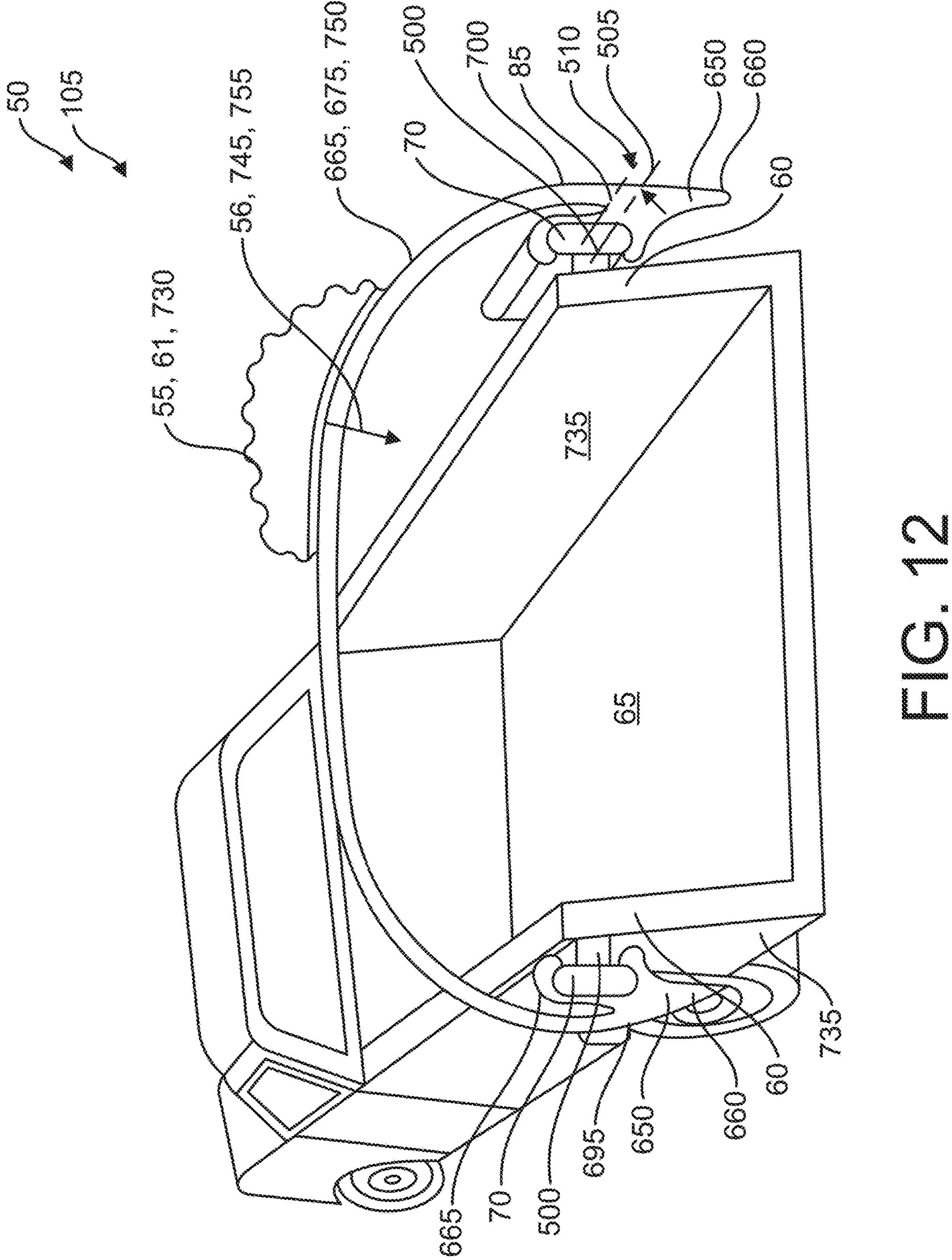
FIG. 12 shows the installed use detail of the article support system with the rail structure optionally affixed to the outsides of the truck bed sides, with the interface of the flexible support arm proximal end portion "C" shaped cross section to the rail structure in the assembled operational state for the article support system version that attaches to the truck bed that includes the first element for a grasping handhold and a second element that forms an arcuate section that can support an article in the form of a tarp cover, wherein the arcuate section terminates in another support arm extension that is oppositely positioned on the truck bed.

FIG. 12 shows the installed use detail of the article support system 50 with the rail structure 70 optionally affixed to the outsides of the truck bed sides 735, with the interface of the flexible support arm 155 proximal end portion "C" shaped cross section 210 to the rail structure 70 in the assembled operational state 105 for the article support system 50 version that attaches to the truck bed 735 that includes the first element 650 for the grasping handhold 720 and the second element 665 that forms an arcuate section 675 that can support an article 55 in the form of a tarp cover, wherein the arcuate section 675 terminates 700 in another support arm extension 155 that is oppositely positioned on the truck bed 735.

Broadly, in looking at FIGS. 1 to 12, the present invention is the article support system 50 that is adapted to support an article 55 upon and relative to a surface 60, wherein the article 55 is suspended 61 above a floor surface 65 that includes the substantially rigid rail structure 70 that includes a rail first end portion 75 and an opposing rail second end portion 80 with a longitudinal axis 85 spanning therebetween. Further the rail structure 70 has a primary margin portion 90 and an opposing secondary margin portion 95 with a longwise axis 100 spanning therebetween, wherein the primary 90 and secondary 95 margin portions are about the longitudinal axis 85. In addition the rail structure 70 includes a first outer surface portion 115 and an opposing second outer surface portion 120, with a shortwise axis 125 spanning therebetween, wherein the first 115 and second 120 outer surface portions are about the longitudinal axis 85, wherein the second outer surface 120 is adapted to affix 135 to the wall surface 60, wherein the primary 90 and secondary 95 margins are structurally formed as a convex semi-circular radius surface 140 that has a tangent interface 145 with each of the first 115 and second 120 outer surface portions, the longitudinal 85, longwise 100, and short wise 125 axes are all perpendicular 150 to one another.

Also included in the article support system 50 is the flexible support arm extension 155 having a proximal end portion 160 and an opposing distal end portion 165 with an arm axis 170 spanning therebetween, the distal end portion 165 is adapted 175 to removably engage the article 55, the proximal end portion 160 is structurally substantially formed as a box channel 180 having the upper leg 185, the lower leg 190, and the web 195 disposed therebetween, each of the upper 185 and lower 190 legs terminating in the upper 200 and lower 205 returns respectively such that the upper return 200, upper leg 185, web 195, lower leg 190, and lower return 205 substantially form a "C" shape 210 in cross section.

Wherein operationally, to removably engage 106 the support arm extension 155 from the rail structure 70, the upper leg 185 and the upper return 200 are manually placed about the secondary margin portion 95 and the lower leg 190 and the lower return 205 are in slidable contact 760 with the secondary margin portion 95 and then through flexure of the web 195 bow 300 in conjunction with the first force 630 the upper 185 leg to snap over the substantially "C" shape 210 about the rail structure 70 primary 90 margin portion and the first outer surface portion 115 and then manually relaxing the upper 185 and lower 190 legs and the web 195 that results in the upper 185 and lower 190 legs, the upper 200 and lower 205 returns, and the web 195 to adjacently grip the rail structure 70 primary 90 and secondary 95 margin portions and the first outer surface portion 115 to secure the support arm extension 155 to the rail structure 70 via locking the support arm extension 155 in movement along the longitudinal 85, longwise 100, shortwise 125, and arm 170 axes relative to the rail structure 70, see FIGS. 7 and 8.

The web 195 having a web axis 540 disposed between the upper 185 and lower 190 legs, wherein the support arm extension 155 distal end portion 165 that is adapted to removably engage 175 the article 55 is constructed of a finger extension portion 230 having a finger extension axis 545, the finger extension portion 230 projecting substantially perpendicularly 550 outward from the web 195 being more opposingly adjacent 555 to the lower leg 190 than to the upper leg 185, such that the finger extension axis 545 is substantially perpendicular 560 to the web axis 540, the finger extension portion 230 further includes an arm portion 565 having an arm portion 565 proximal end portion 570 and an opposing arm portion distal end portion 575, with an arm length 580 that is disposed between the arm portion proximal end portion 570 and the opposing arm portion distal end portion 575, the arm portion length 580 is greater than a web distance 590 between the upper 185 and lower 190 legs, the arm proximal end portion 570 is affixed 595 at a portion to the web 195 with the arm distal end portion 575 having a first means 600 to removably engage the article 55.

Wherein the finger extension axis 545 is disposed between the arm proximal end portion 570 and the arm distal end portion 575, the arm portion 565 further having an arm cross sectional area 605 that is greater than a web cross sectional area 610 to structurally cause the arm portion 565 to have an arm bending stiffness 615 along the finger extension axis 545 to be greater than a web bending stiffness 620 along the web axis 540, this is to operationally facilitate a manual grasping 625 of the first means 600 to manually apply a first force 630 parallel to the web axis 540 to bend 300 the web 195 along the web axis 540 to separate the upper 185 and lower 190 legs to facilitate removable engagement to the primary 90 and secondary 95 margin portions of the rail structure 70, operationally facilitating an assembled state 105 of the rail structure 70 and the support arm extension 155 and a disassembled operational state 106 of the rail structure 70 and the support arm extension 155, see FIGS. 3, 4, 5, and 7, 8, 9, note that the aforementioned also applies to the truck bed 735 version as shown in FIGS. 10, 11, and 12.

As an option for the article support system 50, is wherein the first means 600 to removably engage the article 55 is constructed of an open "J" hook 235 that is positioned at a termination 576 of the arm distal end portion 575, wherein the open "J" hook 235 has a center of gravity 240 from a weight 56 of the article 55 that is transformed into an article force 56 that pulls against the web 195 at the affixed portion 595 of the arm proximal end portion 570 to bow 260 the web 195 into a concave arc 260 away along the web axis 540 away from the rail structure 70 first outer surface that results in the upper 185 and lower 190 legs that terminate in the upper 200 and lower 205 returns respectively having force to be moved closer to one another, resulting in a tighter grip of the upper 185 and lower 190 legs and respective returns 200, 205 upon the rail structure 70 primary 90 and secondary 95 margins portions to better resist a heavy article 55 from dislodging the support arm extension 155 from the rail structure 70, further dynamically such that a higher article force 56 results in an even tighter grip of the upper 185 and lower 190 legs and respective returns 200, 205 upon the rail structure 70 primary 90 and secondary 95 margins portions to better resist a heavier article 55 from dislodging the support arm extension 155 from rail structure 70, see primarily FIGS. 6 and 8, A further option for the article support system 50, is wherein the second outer surface 120 further comprises a beam 500, wherein the beam 500 has a beam length axis 505 that is positioned in a juxtapose manner 510 to the longitudinal axis 85, the beam 500 is disposed as between the second outer surface 120 and the surface 60, wherein the beam 500 has a short distance 515 that is less than a space distance 520 between the primary 90 and secondary 95 margin portions, the beam 500 further has a thickness distance 530 that is substantially equal to a rail 70 thickness distance 530 that is between the first 115 and second 120 outer surface portions, wherein the beam 500 structurally creates a pair of longwise space gaps 535 between the surface 60 and the primary 90 and secondary 95 margin portions and the convex semi-circular radius surfaces 140, see FIGS. 7, 8, 9, 10, 11, and 12.

Alternatively, for the article support system 50, is wherein the upper 200 return and the lower 205 return are each fully extended to completely encompass respectively each of the primary 90 and the secondary 95 margin portions including the convex semi-circular radius surfaces 140 beyond the tangent interfaces 145 for the upper 200 and lower 205 returns approaching one another in the assembled operational state 105, such that the fully extended upper 200 and lower 205 returns occupy a portion of the pair of longwise space gaps 535, to operationally facilitate a higher surface area grip of the upper 200 and lower 205 returns upon the rail structure 70, again see FIGS. 7, 8, 9, 10, 11, and 12.

Another alternative for the article support system, is wherein the first means 600 to removably engage the article 55 is constructed of an open "J" hook 235 that is positioned at a termination 576 of the arm distal end portion 575, wherein the open "J" hook 235 has a center of gravity 240 from a weight 56 of the article 55 that is transformed into an article force 56 that pulls against the web 195 at the affixed portion 595 of the arm proximal end portion 570 to bow 260 the web 195 into a concave arc away along the web axis 540 away from the rail structure 70 first outer surface 115 that results in the upper 185 and lower 190 legs that terminate in the upper 200 and lower 205 returns respectively having force to be moved closer to one another, resulting in a tighter grip of the upper 185 and lower 190 legs and respective returns 200, 205 upon the rail structure 70 primary 90 and secondary 95 margin portions to better resist a heavy article 56 from dislodging the support arm extension 155 from the rail structure 70, further dynamically such that a higher article force 56 results in an even tighter grip of the upper 185 and lower 190 legs and respective returns 200, 205 upon the rail structure 70 primary 90 and secondary 95 margins portions to better resist a heavier article 56 from dislodging the support arm extension 155 from the rail 70, see FIG. 8.

As an alternative embodiment for the article support system 50, in looking at FIGS. 10 to 12, the present invention is the article support system 50 that is adapted to support an article 55 upon and relative to a surface 60, wherein the article 55 is suspended 61 above a floor surface 65 that includes a parallel pair of opposingly positioned horizontally spaced apart substantially rigid rail structures 70 that each includes a rail first end portion 75 and an opposing rail second end portion 80 with a longitudinal axis 85 spanning therebetween, further each rail structure 70 has a primary margin portion 90 and an opposing secondary margin portion 95 with a longwise axis 100 spanning therebetween, wherein the primary 90 and secondary 95 margin portions are about the longitudinal axis 85, in addition each rail structure 70 includes a first outer surface portion 115 and an opposing second outer surface portion 120, with a shortwise axis 125 spanning therebetween, wherein each first 115 and second 120 outer surface portions are about 130 the longitudinal axis 85, wherein each first 115 or second 120 outer surface is adapted to affix 135 to the surface 60, wherein each of the primary 90 and secondary 95 margins are structurally formed as a convex semi-circular radius 140 surface that has a tangent interface 145 with each of the first 115 and second 120 outer surface portions, the longitudinal 85, longwise 100, and short wise 125 axes are all perpendicular 150 to one another.

Further included in the alternative embodiment for the article support system 50 is a pair of opposingly positioned flexible support arm extensions 155 each having a proximal end portion 160 and an opposing distal end portion 165, each distal end portion 165 is branched off into two elements, a first element 650 adapted to be manually grasped 660 and an opposing second element 665 that spans continuously in an arcuate shape 675 forming an inverted "U" to an opposing second element 665 of the pair of flexible support arm extensions 155, each proximal end portion 160 is structurally substantially formed as a box channel 180 having an upper leg 185, a lower leg 190, and a web 195 disposed therebetween, each of the upper 185 and lower 190 legs terminating in an upper 200 and lower 205 return respectively such that the upper return 200, upper leg 185, web 195, lower leg 190, and lower return 205 substantially form a "C" shape 210 in cross section, each web 195 having a web axis 540 disposed between the upper 185 and lower 190 legs, wherein each support arm extension distal end portion 165 first element 650 having a first element axis 655, the first element 650 projecting substantially outward 680 in a parallel manner 680 from the web 195, wherein the first element 650 projects 680 adjacent to the lower leg.

Wherein the web axis 540 and the first element axis 655 are substantially co-incident 685 to one another, the second element 665 having a second element axis 670, the second element 665 projects in an opposing manner 690 from the first element 650, wherein the second element 665 has an origination 695 at the web 195 adjacent to the lower leg 190 continuing toward the arcuate shape 675 and further projecting toward the opposing flexible support arm extension 155, wherein the second element 665 has a termination 700 at the opposing web 195 adjacent to the opposing lower leg 190, wherein the second element axis 670 and the first element axis 655 are substantially co-incident 705 to one another, each first element 650 further having a first element cross sectional area 710 that is greater than a web 195 cross sectional area 610 to structurally cause the first element 650 to have a first element bending stiffness 715 along the first element axis 655 to be greater than a web 195 bending stiffness 300 along the web axis 540, this is to operationally facilitate a manual grasping 660 of the first element 650 to manually apply a first force 725 perpendicular to the web axis 540 to bend 300 the web 195 along the web axis 540 to separate the upper 185 and lower 190 legs to facilitate removable engagement to the primary 90 and secondary 95 margin portions of the rail structure 70, operationally facilitating an assembled state 105 of the rail structure 70 and the support arm extension 155 and a disassembled operational state 106 of the rail structure 70 and the support arm extension 155, wherein operationally the arcuate shape 675 of the second element 665 can support a tarp cover 55, 730 suspended 61 over a truck bed 65 wherein the rigid rail structures 70 are attached to truck bed sides 735, which can be either inside or outside of the truck bed sides 735.

An option for the alternative embodiment for the article support system 50, wherein said arcuate shape 675 of the second element 665 at the second element 665 origination 695 is configured to have an angular gap 740 to the web 195 to facilitate that when a tarp cover 730 weight 56 is applied to the arcuate shape 675 upon a convex portion 750 of the arcuate shape 675, tarp cover weight 56 is transformed into a tarp cover force 745, 755 that pulls against the web 195 at the second element 665 origination 695 to bow 260 the web 195 into a concave arc away along the web 195 axis 540 away from the rail structure 70 first 115 or second 120 outer surface that results in the upper 185 and lower 190 legs that terminate in the upper 200 and lower 205 returns respectively having force to be moved closer to one another, resulting in a tighter grip of the upper 185 and lower 190 legs and respective returns 200, 205 upon the rail structure 70 primary 90 and secondary 95 margins portions to better resist a heavy tarp cover 745 from dislodging the support arm extension 155 from the rail structure 70, further dynamically such that a higher tarp cover force 745 results in an even tighter grip of the upper 185 and lower 190 legs and respective returns 200, 205 upon the rail structure 70 primary 90 and secondary 95 margins portions to better resist a heavier tarp cover 745 from dislodging the support arm extension 155 from the rail 70, see FIGS. 6, 8, 10, 11, and 12.

A method of installing the article support system 50 that is adapted to support an article 55 upon and relative to a surface 60, wherein the article 55 is suspended above the floor surface 60, the method of installing the article support system 50 comprising the steps of providing the substantially rigid rail structure 70 as previously described, providing a flexible support arm extension 155 as previously described, next a step of grasping manually 765 the first means 600 to removably engage the article 55, see FIGS. 7 and 10, then a step of placing 770 the lower leg 190 and the lower return 205 are manually placed about the secondary margin portion 95, see FIGS. 7 and 10, a further step of pushing manually 775 the first means 600 to removably engage the article 55 toward the primary margin portion 90 while maintaining a slidable contact 760 as between the lower leg 190 and the secondary margin portion 95, see FIGS. 7 and 10, a continuing step of making contact 780 as between the upper return 200 and the primary margin portion 90, see FIGS. 7 and 10.

Continuing on method of installing the article support system 50, a next step of continuing to manually push 785 as in the step 775 on the first means 600 to removably engage the article 55 toward the primary margin 90 causing the upper leg 185 and the upper return 200 to be manually pushed over the primary margin portion 90 through flexure 300 of the web 195 in conjunction with the upper 185 and lower 190 legs to position said substantially "C" shape 210 about the rail structure 70 primary 90 and secondary 95 margin portions and the first outer surface portion 115, see FIGS. 8 and 10, and a final step of removing the pushing in said step 775 on the first means 600 to removably engage the article 55 resulting in relaxing the upper 185 and lower 190 legs and the web 195 that results in the upper 185 and lower 190 legs, the upper 200 and lower 205 returns, and the web 195 to adjacently grip the rail structure 70 primary 90 and secondary 95 margin portions and the first outer surface portion 115 to secure the support arm extension 155 to the rail structure 70 via locking the support arm extension 155 in movement along the longitudinal 85, longwise 100, shortwise 125, and the finger extension 545 axes relative to the rail structure 70, see FIGS. 2, 3, 8, and 10.

To reverse the method of installing to uninstall the article support system 50, wherein step 775 is modified to continuing the pushing in step 775 to bring 790 the lower return 205 past the secondary margin portion 95 through the flexure 300 of the web in step 785 to facilitate the upper leg 185 to clear away from the primary margin portion 90 ultimately separating the flexible support arm extension 155 and the substantially rigid rail structure 70 from one another, see FIGS. 4, 5, and 9.

Accordingly, the present invention of the article support system has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. An article support system that is adapted to support an article upon and relative to a surface, wherein the article is suspended above a floor surface, comprising:

(a) a substantially rigid rail structure that includes a rail first end portion and an opposing rail second end portion with a longitudinal axis spanning therebetween, further said rail structure has a primary margin portion and an opposing secondary margin portion with a longwise axis spanning therebetween, wherein said primary and secondary margin portions are about said longitudinal axis, in addition said rail structure includes a first outer surface portion and an opposing second outer surface portion, with a shortwise axis spanning therebetween, wherein said first and second outer surface portions are about said longitudinal axis, wherein said second outer surface is adapted to affix to the surface, wherein said primary and secondary margins are structurally formed as a convex semi-circular radius surface that has a tangent interface with each of said first and second outer surface portions, said longitudinal, longwise, and short wise axes are all perpendicular to one another; and (b) a flexible support arm extension having a proximal end portion and an opposing distal end portion with an arm axis spanning therebetween, said distal end portion is adapted to removably engage the article, said proximal end portion is structurally substantially formed as a box channel having an upper leg, a lower leg, and a web disposed therebetween, each of said upper and lower legs terminating in an upper and lower return respectively such that said upper return, upper leg, web, lower leg, and lower return substantially form a "C" shape in cross section, said web having a web axis disposed between said upper and lower legs, wherein said support arm extension distal end portion that is adapted to removably engage the article is constructed of a finger extension portion having a finger extension axis, said finger extension portion projecting substantially perpendicularly outward from said web being affixed to said lower leg, such that said finger extension axis is substantially perpendicular to said web axis, said finger extension portion further includes an arm portion having an arm portion proximal end portion and an opposing arm portion distal end portion, with an arm length that is disposed between said arm portion proximal end portion and said opposing arm portion distal end portion, said arm portion length is greater than a web distance between said upper and lower legs, said arm proximal end portion is affixed to said lower leg with said arm distal end portion having a first means to removably engage the article, wherein said finger extension axis is disposed between said arm proximal end portion and said arm distal end portion, said arm portion further having an arm cross sectional area that is greater than a web cross sectional area to structurally cause said arm portion to have an arm bending stiffness along said finger extension axis to be greater than a web bending stiffness along said web axis, this is to operationally facilitate a manual grasping of said first means to manually apply a first force parallel to said web axis to bend said web along said web axis to separate said upper and lower legs to facilitate removable engagement to said primary and secondary margin portions of said rail structure, operationally facilitating an assembled state of said rail structure and said support arm extension and a disassembled operational state of said rail structure and said support arm extension.

2. An article support system according to claim 1 wherein said first means to removably engage the article is constructed of an open “J” hook that is positioned at a termination of said arm distal end portion, wherein said open “J” hook has a center of gravity from a weight of the article that is transformed into an article force that pulls against said web at said affixed portion of said arm proximal end portion to bow said web into a concave arc away along said web axis away from said rail structure first outer surface that results in said upper and lower legs that terminate in said upper and lower returns respectively having force to be moved closer to one another, resulting in a tighter grip of said upper and lower legs and respective returns upon said rail structure primary and secondary margins portions to better resist a heavy article from dislodging said support arm extension from said rail structure, further dynamically such that a higher article force results in an even tighter grip of said upper and lower legs and respective returns upon said rail structure primary and secondary margins portions to better resist a heavier article from dislodging said support arm extension from said rail.

3. An article support system according to claim 1 wherein said second outer surface further comprises a beam, wherein said beam has a beam length axis that is positioned in a juxtapose manner to said longitudinal axis, said beam is disposed as between said second outer surface and the surface, wherein said beam has a short distance that is less than a space distance between said primary and secondary margin portions, said beam further has a thickness distance that is substantially equal to a rail thickness distance that is between said first and second outer surface portions, wherein said beam structurally creates a pair of longwise continuous space gaps between the surface and said primary and secondary margin portions and said convex semi-circular radius surfaces, wherein said pair of longwise continuous space gaps are positioned along said beam length axis that is positioned in said juxtapose manner to said longitudinal axis.

4. An article support system according to claim 3 wherein said upper return and said lower return are each fully extended to completely encompass respectively each of said primary and said secondary margin portions including said convex semi-circular radius surfaces beyond said tangent interfaces for said upper and lower returns approaching one another in said assembled operational state, such that said fully extended upper and lower returns occupy a portion of said pair of longwise continuous space gaps, to operationally facilitate a higher surface area grip of said upper and lower returns upon said rail structure.

5. An article support system according to claim 4 wherein said first means to removably engage the article is constructed of an open “J” hook that is positioned at a termination of said arm distal end portion, wherein said open “J” hook has a center of gravity from a weight of the article that is transformed into an article force that pulls against said web at said affixed portion of said arm proximal end portion to bow said web into a concave arc away along said web axis away from said rail structure first outer surface that results in said upper and lower legs that terminate in said upper and lower returns respectively having force to be moved closer to one another, resulting in a tighter grip of said upper and lower legs and respective returns upon said rail structure primary and secondary margins portions to better resist a heavy article from dislodging said support arm extension from said rail structure, further dynamically such that a higher article force results in an even tighter grip of said upper and lower legs and respective returns upon said rail structure primary and secondary margins portions to better resist a heavier article from dislodging said support arm extension from said rail.

6. An article support system that is adapted to support an article upon and relative to a surface, wherein the article is suspended above a floor surface, said article support system comprising:

(a) a parallel pair of opposingly positioned horizontally spaced apart substantially rigid rail structures that each includes a rail first end portion and an opposing rail second end portion with a longitudinal axis spanning therebetween, further each said rail structure has a primary margin portion and an opposing secondary margin portion with a longwise axis spanning therebetween, wherein said primary and secondary margin portions are about said longitudinal axis, in addition each said rail structure includes a first outer surface portion and an opposing second outer surface portion, with a shortwise axis spanning therebetween, wherein each said first and second outer surface portions are about said longitudinal axis, wherein each said first or second outer surface is adapted to affix to the surface, wherein each of said primary and secondary margins are structurally formed as a convex semi-circular radius surface that has a tangent interface with each of said first and second outer surface portions, said longitudinal, longwise, and short wise axes are all perpendicular to one another; and (b) a pair of opposingly positioned flexible support arm extensions each having a proximal end portion and an opposing distal end portion with an arm axis spanning therebetween, each said distal end portion is branched off into two elements, a first element adapted to be manually grasped and an opposing second element that spans continuously in an arcuate shape forming an inverted “U” to an opposing second element of said pair of flexible support arm extensions, each said proximal end portion is structurally substantially formed as a box channel having an upper leg, a lower leg, and a web disposed therebetween, each of said upper and lower legs terminating in an upper and lower return respectively such that said upper return, upper leg, web, lower leg, and lower return substantially form a “C” shape in cross section, each said web having a web axis disposed between said upper and lower legs, wherein each said support arm extension distal end portion first element having a first element axis, said first element projecting substantially outward in a parallel manner from said web, wherein said first element projects adjacent to said lower leg, wherein said web axis and said first element axis are substantially co-incident to one another, said second element having a second element axis, said second element projects in an opposing manner from said first element, wherein said second element has an origination at said web adjacent to said lower leg continuing toward said arcuate shape and further projecting toward said opposing flexible support arm extension, wherein said second element has a termination at said opposing web adjacent to said opposing lower leg, wherein said second element axis and said first element axis are substantially co-incident to one another, each said first element further having a first element cross sectional area that is greater than a web cross sectional area to structurally cause said first element to have a first element bending stiffness along said first element axis to be greater than a web bending stiffness along said web axis, this is to operationally facilitate a manual grasping of said first element to manually apply a first force perpendicular to said web axis to bend said web along said web axis to separate said upper and lower legs to facilitate removable engagement to said primary and secondary margin portions of said rail structure, operationally facilitating an assembled state of said rail structure and said support arm extension and a disassembled operational state of said rail structure and said support arm extension, wherein operationally said arcuate shape of said second element can support a tarp cover suspended over a truck bed wherein said rigid rail structure are attached to truck bed sides.

7. An article support system according to claim 6 wherein said arcuate shape of said second element at said second element origination is configured to have an angular gap to said web to facilitate that when a tarp cover weight is applied to said arcuate shape upon a convex portion of said arcuate shape, said tarp cover weight is transformed into a tarp cover force that pulls against said web at said second element origination to bow said web into a concave arc away along said web axis away from said rail structure first or second outer surface that results in said upper and lower legs that terminate in said upper and lower returns respectively having force to be moved closer to one another, resulting in a tighter grip of said upper and lower legs and respective returns upon said rail structure primary and secondary margins portions to better resist a heavy tarp cover from dislodging said support arm extension from said rail structure, further dynamically such that a higher tarp cover force results in an even tighter grip of said upper and lower legs and respective returns upon said rail structure primary and secondary margins portions to better resist a heavier tarp cover from dislodging said support arm extension from said rail.

8. A method of installing an article support system that is adapted to support an article upon and relative to a surface, wherein the article is suspended above a floor surface, said method of installing said article support system comprising the steps of:

(a) providing a substantially rigid rail structure that includes a rail first end portion and an opposing rail second end portion with a longitudinal axis spanning therebetween, further said rail structure has a primary margin portion and an opposing secondary margin portion with a longwise axis spanning therebetween, wherein said primary and secondary margin portions are about said longitudinal axis, in addition said rail structure includes a first outer surface portion and an opposing second outer surface portion, with a shortwise axis spanning therebetween, wherein said first and second outer surface portions are about said longitudinal axis, wherein said second outer surface is adapted to affix to the surface, wherein said primary and secondary margins are structurally formed as a convex semi-circular radius surface that has a tangent interface with each of said first and second outer surface portions, said longitudinal, longwise, and short wise axes are all perpendicular to one another;

(b) providing a flexible support arm extension having a proximal end portion and an opposing distal end portion with an arm axis spanning therebetween, said distal end portion is adapted to removably engage the article, said proximal end portion is structurally substantially formed as a box channel having an upper leg, a lower leg, and a web disposed therebetween, each of said upper and lower legs terminating in an upper and lower return respectively such that said upper return, upper leg, web, lower leg, and lower return substantially form a "C" shape in cross section, said web having a web axis disposed between said upper and lower legs, wherein said support arm extension distal end portion that is adapted to removably engage the article is constructed of a finger extension portion having a finger extension axis, said finger extension portion projecting substantially perpendicularly outward from said web being affixed to said lower leg, such that said finger extension axis is substantially perpendicular to said web axis, said finger extension portion further includes an arm portion having an arm portion proximal end portion and an opposing arm portion distal end portion, with an arm length that is disposed between said arm portion proximal end portion and said opposing arm portion distal end portion, said arm portion length is greater than a web distance between said upper and lower legs, said arm proximal end portion is affixed to said lower leg with said arm distal end portion having a first means to removably engage the article, wherein said finger extension axis is disposed between said arm proximal end portion and said arm distal end portion, said arm portion further having an arm cross sectional area that is greater than a web cross sectional area to structurally cause said arm portion to have an arm bending stiffness along said finger extension axis to be greater than a web bending stiffness along said web axis, this is to operationally facilitate a manual grasping of said first means to manually apply a first force parallel to said web axis to bend said web along said web axis to separate said upper and lower legs to facilitate removable engagement to said primary and secondary margin portions of said rail structure, operationally facilitating an assembled state of said rail structure and said support arm extension and a disassembled operational state of said rail structure and said support arm extension;

(c) grasping manually said first means to removably engage the article;

(d) placing said lower leg and said lower return are manually placed about said secondary margin portion;

(e) pushing manually said first means to removably engage the article toward said primary margin portion while maintaining a slidable contact as between said lower leg and said secondary margin portion;

(f) making contact as between said upper return and said primary margin portion;

(g) continuing to manually push as in said step (e) said first means to removably engage the article toward said primary margin causing said upper leg and said upper return to be manually pushed over said primary margin portion through flexure of said web in conjunction with said upper and lower legs to position said substantially "C" shape about said rail structure primary and secondary margin portions and said first outer surface portion; and (h) removing said pushing in said step (e) on said first means to removably engage the article resulting in relaxing said upper and lower legs and said web that results in said upper and lower legs, said upper and lower returns, and said web to adjacently grip said rail structure primary and secondary margin portions and said first outer surface portion to secure said support arm extension to said rail structure via locking said support arm extension in movement along said longitudinal, longwise, shortwise, and arm axes relative to said rail structure.

9. A method of installing an article support system according to claim 8, wherein said step (h) is modified to continuing said pushing in step (e) to bring said lower return past said secondary margin portion through said flexure of said web in step (g) to facilitate said upper leg to clear away from said primary margin portion ultimately separating said flexible support arm extension and said substantially rigid rail structure from one another.

* * * * *